Oct. 27, 1942.  R. E. WEEMS  2,299,774
MACHINE FOR TREATING SHRIMP
Filed Aug. 2, 1940   3 Sheets-Sheet 1
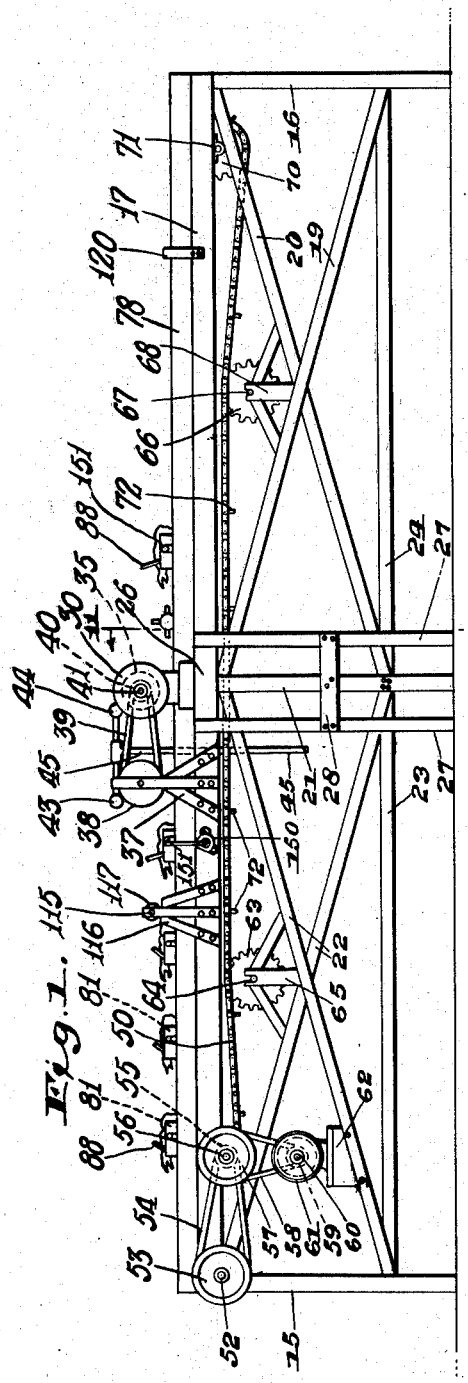
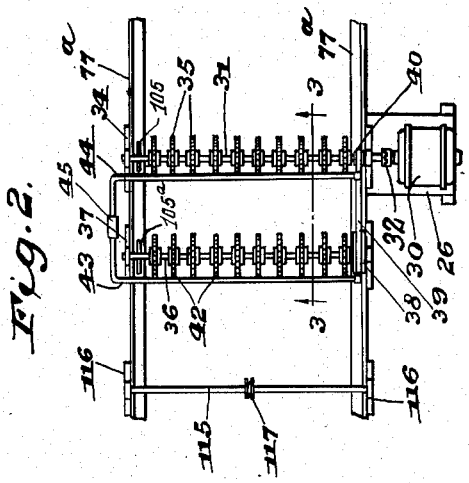
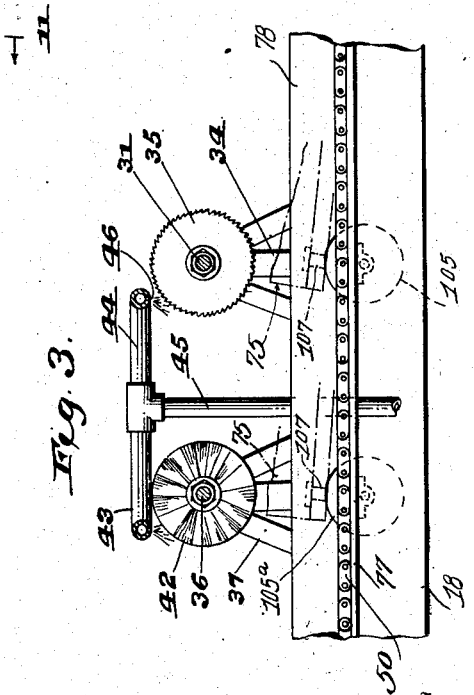
Inventor
R. E. Weems

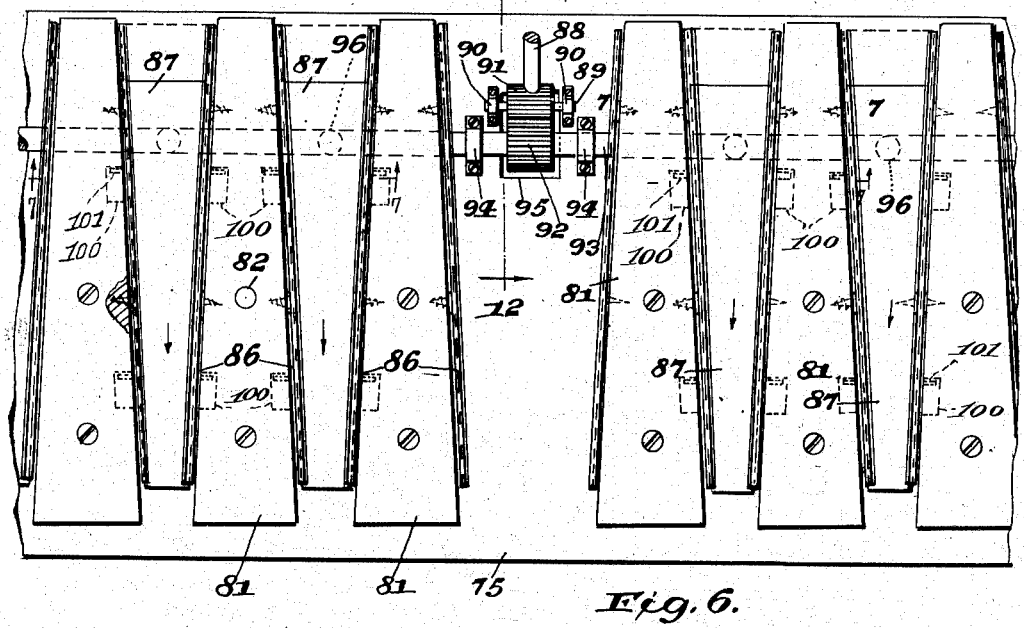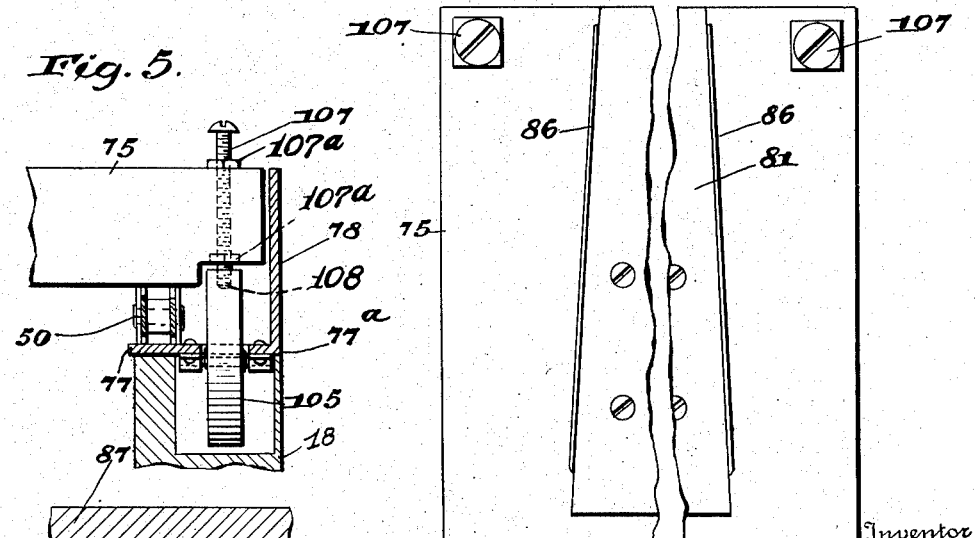

Oct. 27, 1942.                R. E. WEEMS                 2,299,774
                       MACHINE FOR TREATING SHRIMP
                         Filed Aug. 2, 1940        3 Sheets-Sheet 3
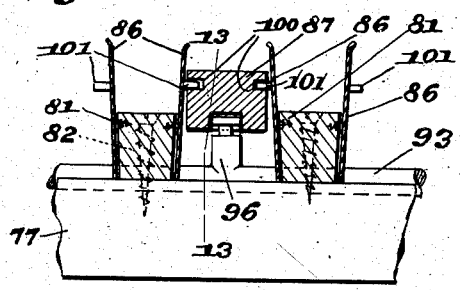
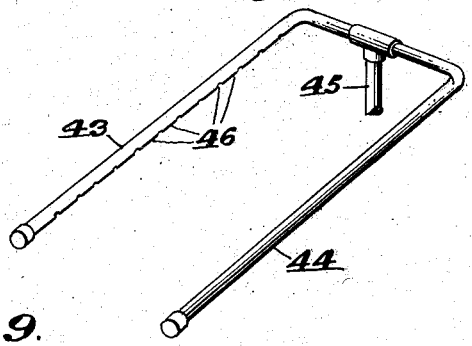
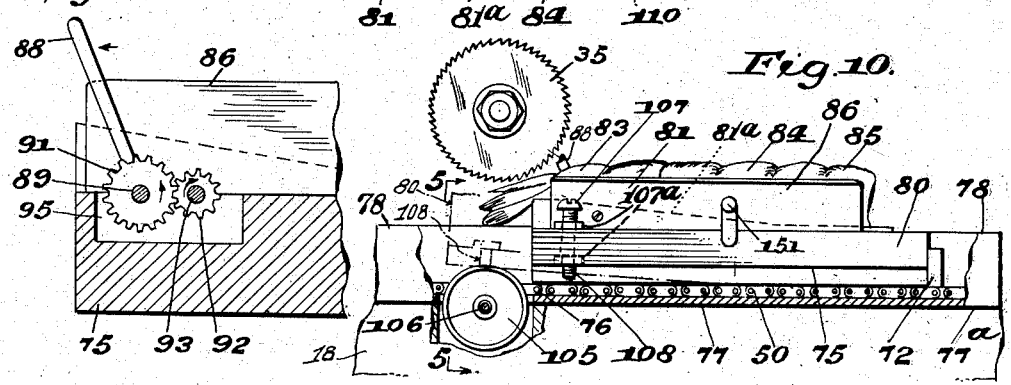
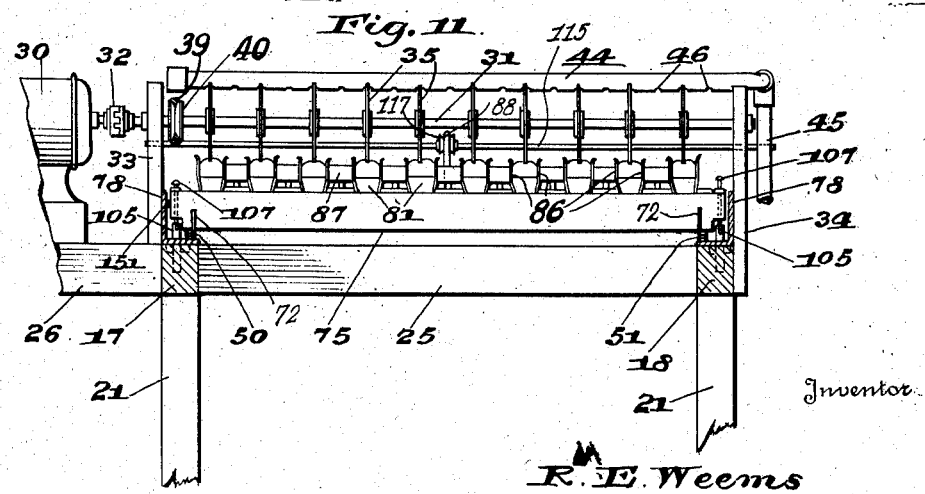
Inventor
R. E. Weems Patented Oct. 27, 1942

2,299,774

UNITED STATES PATENT OFFICE 2,299,774

MACHINE FOR TREATING SHRIMP

Rupert E. Weems, Galveston, Tex.

Application August 2, 1940, Serial No. 349,477

10 Claims. (Cl. 17—2)

This invention relates to a machine for treating shrimp.

An object of the invention is the provision of a machine through which a plurality of series of shrimp are successively acted on by a plurality of instrumentalities for releasing the intestinal tract from shrimp in such a manner that a continuous series of shrimp may be fed through the machine.

Another object of the invention is the provision of a machine for removing the intestinal tract and its contents from shrimp in which a plurality of shrimp may be placed side by side and run through saws and brushes for removing the tract, with means for retaining the shrimp in rows during the time that the shrimp are treated, the retaining means being released after the shrimp have been cleaned so that the shrimp may be readily removed from their fixed position for the application of a fresh batch of shrimp.

A further object of the invention is the provision of a machine for cutting longitudinal slots through the back of shrimp so that the intestinal tract and its contents may be removed therefrom, the shrimp being raised when the tail portion of the shrimp passes under cutters so that a sufficient depth of cut will be had to reach the intestinal tract, which is at a lower position in the tail region than in the body portion.

This invention will be best understood from a consideration of the following detailed description, in view of the accompanying drawings forming a part of the specification; nevertheless, it is to be understood that the invention is not confined to the disclosure, being susceptible to such changes and modifications as define no material departure from the salient features of the invention as expressed in the appended claims.

In the drawings:

Figure 1 is a longitudinal side elevation of a machine for cleaning shrimp,

Figure 2 is a fragmentary plan view of a machine showing the cutters and brushes for cleaning the shrimp, Figure 3 is an enlarged fragmentary vertical longitudinal section taken along the line 3—3 of Figure 2, Figure 4 is an enlarged fragmentary plan view of a tray for holding the shrimp during the cleaning period, Figure 5 is an enlarged fragmentary vertical section taken along the line 5—5 of Figure 10, Figure 6 is a broken plan view of a tray, Figure 7 is a vertical section taken along the line 7—7 of Figure 4, Figure 8 is a view in perspective of a sprinkling means, Figure 9 is a fragmentary longitudinal section of a tray with a shrimp applied thereto showing the cutting line of the saws, Figure 10 is a fragmentary side view with parts broken away of the machine showing a tray supporting a shrimp just before the shrimp passes through a rotary saw, Figure 11 is a transverse vertical section taken along the line 11—11 of Figure 1, Figure 12 is a fragmentary vertical section taken along the line 12—12 of Figure 4, and Figure 13 is a fragmentary longitudinal vertical sectional view taken along the line 13—13 of Figure 7.

Referring more particularly to the drawings, 15 and 16 represent pairs of spaced end posts for supporting horizontally disposed longitudinal bars 17 and 18. Brace bars 19 and 20 are diagonally disposed and are secured between the posts 16 and a pair of spaced posts 21 at the center of the machine. A pair of diagonally disposed brace bars 22 are connected between the pairs of posts 15 and the pairs of posts 21. Reinforcing bars 23 are connected between the posts 15 and the posts 21, while a pair of base bars 24 are connected between the posts 21 and the posts 16, respectively. At spaced points are a plurality of transverse bars 25 which are connected between the longitudinal bars 17 and 18, as shown more particularly in Figure 11.

A table 26 extends laterally from the longitudinal bar 17 and legs 27 project downwardly therefrom and these legs are connected by brace bars 28. These legs support the table 26, as shown more particularly in Figures 1 and 11.

An electric motor 30 is mounted upon the table 26 and is directly connected with a shaft 31 by a flexible coupling 32. This shaft is mounted in bearings formed in standards 33 and 34. The standard 33 is connected to the table 26 while the standard 34 is connected directly to the longitudinal bar 18.

A plurality of circular saws 35 are secured in spaced relation to the shaft 31 and are in vertical parallel planes running longitudinally of the machine. These saws are relatively thin and are provided with fine teeth so that only a small cut will be made through the back of the shrimp but the cut is sufficiently wide to provide a slot of sufficient width so that the intesinal tract and the contents of said tract may be removed as will be presently explained. Any number of saws may be located transversely and in spaced relation of the machine and the number will depend upon the width of the machine.

A shaft 36 is mounted in brackets 37 secured to the spaced longitudinal bars 17 and 18 and this shaft is driven by a pulley 38 secured to said shaft and by means of a belt 39 driven by a pulley 40 connected with a motor shaft 41 at one side of the machine and adjacent the table 26.

A plurality of thin circular brushes 42 is secured in spaced relation on the shaft 36 and each of these brushes is in the same vertical plane with a corresponding circular saw 35 on the shaft 31. In view of the fact that the pulley 40 is considerably smaller than the pulley 38, the rotary brushes 42 are driven at a considerably slower speed than the saws 35. These brushes are adapted to follow the cuts made by the saws 35 for removing the intestinal tracts and their contents.

A pair of spaced perforated pipes 43 and 44 are connected to a branch pipe 45 and this branch pipe is in communication with a source of water under pressure. As shown mort particularly in Figure 11, the pipes 43 and 44 are provided with a plurality of perforations 46 for spraying water onto the shrimp when they are being cut and during the brushing action.

Chains 50 and 51 (Figures 1 and 11) are located adjacent the longitudinal rails 17 and 18, respectively, and these chains are driven by sprockets which are secured to a shaft 52 located at one end of the machine above the posts 15. This shaft is driven by a pulley 53, a belt 54 and a pulley 55 secured to a shaft 56. The shaft 52 may be driven by a reduction gearing.

A pulley 57 secured to the shaft 56 drives the same and this pulley in turn is driven by a belt 58 and a pulley 59 which is secured to a motor shaft 60 which in turn is driven by an electric motor 61 carried by a base member 62 which may be supported in any approved manner between a pair of diagonally disposed brace bars 22 located upon opposite sides of the machine. An idling sprocket 63 located at each side of the machine supports each of the chains 50 at one side of the motor 30. These sprockets are carried by the shaft 64 supported by brackets 65.

A pair of idling sprockets 66 carried by a shaft 67, which in turn is supported by brackets 68, is adapted to support the chains and maintain the chains taut in the machine at the other side of the motor 30. A pair of idling sprockets 70 at the front end of the machine are carried by a shaft 71 which has bearings connected to the rails 17 and 18. The chains are trained over the sprockets 70.

It will be noted that the chains are provided with spaced cleats 72. These cleats are located approximately 12" apart or less and are adapted to contact the trays as the trays are applied to the chains so that when the chains are moving above the beams 25 these cleats will engage the trays and carry them along. The spacing of the cleats is determined by the length of the tray employed.

Referring more particularly to Figs. 4 to 7, inclusive, it will be seen that each tray consists of a flat base member 75 which is placed upon the chains 50 with the side edges located above horizontal flanges 77 of an angle iron generally designated by the numeral 77a. The vertical flanges 78 of these angle irons are adapted to engage the side edges 80 of the trays for maintaining them in position when they are moved by the chains.

A plurality of blocks 81 are secured by means of screws 82 to the base members 75 of the trays. These blocks are not only gradually reduced from the rear end to the front ends, as shown in Fig. 4, but the surface of each is inclined from the front end to the rear end as shown in dotted lines at 81a in Fig. 10 so that the tail portion 83 of the shrimp 84 will be elevated above the bottom of the shrimp adjacent the head portion 85 (Figs. 9 and 10).

At each side of the wedge-shaped supporting blocks 81 are a pair of clamping arms 86. These clamping arms are made of resilient material so that they can be moved inwardly over the top of the block 81 for clamping the shrimp against movement on the tray. These clamping arms are secured in any approved manner to the side walls of the blocks and they are substantially coextensive with the length of the blocks. Wedges 87 are alternately disposed between parts of the associated clamping arms so that when these wedges are moved in the direction indicated by the arrows in Fig. 4 these wedges will force the clamping arms into operative relation with the shrimp. These clamping arms are simultaneously forced into clamping relation by a single movement of a lever 88 in the direction indicated by the arrow in Fig. 12.

A lever 88 is rigidly connected with a shaft 89 and this shaft is mounted in bearings 90 secured to the base member of the tray. A gear 91 is mounted on the shaft 89 and is rocked by the lever 88.

A gear 92 meshing with the gear 91 is secured to a shaft 93 which has bearings 94 on the base member 75. The gear 91 and likewise the gear 92 are located within a pocket 95 formed in the base member at the central portion of said member.

The shaft 93 is provided with a plurality of spaced fingers 96 which project upwardly into slots 97 formed in the bottoms of the wedges 87. The finger 96 is adapted to engage an end wall 98 of the slot when the wedges are moved inwardly in the direction indicated by the arrows in Fig. 4 for forcing the clamping arms or walls 86 into holding relation with the shrimp. When the shaft 93 is rocked in the opposite direction the fingers will engage the end walls 99 of the slots 97 and move the wedges in an inoperative position to release the clamping arms or walls 86 to free the shrimp.

At spaced points the side walls of the wedges, as shown in Fig. 7, are provided with slots 100 to receive pins 101 formed on the outer faces of the clamping arms 86 for aiding in maintaining the wedges in position and for guiding the wedges in their longitudinal movements between the adjacent walls of pairs of the clamping arms.

When the lever 88 is rocked in the direction indicated by the arrow in Fig. 12 the clamping wedges will be moved to an operative position. When, however, the operating arm or lever 88 is moved in the opposite direction the wedges will be moved to an inoperative position to release the shrimp.

Rollers 105 are mounted upon opposite sides of the frame on a shaft 106 and these rollers are located between the saws 35. A pair of bolts 107 is received by spaced passages in the base member 75 directly over the rollers 105 and at points on the trays where the lower ends 108 of said bolts will ride over the rollers 105 so that the forward moving ends of the trays will be raised to permit the saws 35 to produce a deeper cut as indicated at 109 in Fig. 9, because the intestinal tracts at this point of the shrimp 84 are at a lower level than the dotted line portion indicated by the numeral 110 at the forward parts of the shrimp. The bolts are held in place by nuts 107a. A pair of rollers 105a is also located adjacent the brushes 42 so that the tail portions of the shrimp will be raised sufficiently where the lower ends 108 of the bolts 107 ride over said rollers that the brushes may clean out the intestinal tracts and the contents thereof.

Following the brushes 42 there is provided a shaft 115 mounted in bearings in brackets 116 secured to the longitudinal beams 16 and 17 of the frame. A roller 117 is carried by the shaft 115 and is in a position to engage the arm or lever 88 of each tray after the trays have been moved beyond the brushes 42 so that the arm will be moved in a direction opposite to that indicated in Fig. 12 for moving the wedges 87 outwardly and thereby release the clamping arms 86 and likewise the shrimp. After the shrimp have passed beyond this point the trays may be removed and dumped.

A pair of spring arms 120 secured to the longitudinal beams 16 and 17 extend inwardly of the frame and across the path of the moving trays and at a point where the trays are placed on the travelling conveyor or chains 50 and 51. In other words, these spring arms are located adjacent the feeding end of the machine. As the trays are supplied to the workman he places the same on the chains with the front ends of the trays in engagement with the spring arms 120 in order to position the trays at right angles to the path of travel of the trays. Since the chains are moving continuously, the lugs 72 on the chains will engage the rear edges of the bases of the trays and carry them along away from the spring arms 120. These lugs, as has been stated, are placed equal distances from each other so that the trays which have been supplied with the shrimp may be fed continuously to the conveyor and carried in a continuous manner beneath the knives, brushes and the spray of water from the pipes 43 and 44.

When the trays have been filled with shrimp the operator merely moves the lever 88 in the direction indicated by the arrow in Fig. 12, whereupon the wedges will force the clamping arms in operative position with the shrimp. When this arm reaches the roller 117 after the shrimp have been cut and brushed the clamping arm is then released by the roller so that the shrimp may be dropped therefrom.

A counting mechanism 150 of any suitable design secured to the framework adjacent is adapted to be operated by a pin 151 projecting laterally from each tray so that the number of trays passing the member 150 will be counted. The number of shrimp on each tray multiplied by the number of trays counted will give the number of shrimp cleaned.

I claim:

1. A machine for treating shrimp comprising a supporting frame, a plurality of spaced circular saws mounted above the frame, a plurality of circular brushes in successive aligned arrangement with the saws, means moving shrimp into operative relation with the saws and brushes for splitting the shrimp and removing the intestinal tracts therefrom, means spraying a liquid into the shrimp during the cleaning operation, means revolving the saws and brushes, and means raising the tail portions of the shrimp when said portions are contacted by the saws.

2. A machine for treating shrimp comprising a supporting frame, a plurality of spaced circular saws mounted above the frame, a plurality of circular brushes in successive aligned arrangement with the saws, means moving shrimp into operative relation with the saws and brushes for splitting the shrimp and removing the intestinal tracts therefrom, means spraying a liquid on the shrimp during the cleaning operation, means revolving the saws and brushes, and means raising the tail portions of the shrimp successively when said portions are contacted by the saws and brushes in sequence.

3. A machine for treating shrimp comprising a supporting frame, a plurality of spaced circular saws mounted above the frame, a plurality of circular brushes in successive aligned arrangement with the saws, trays for supporting shrimp in alignment with the saws, means moving the trays along a path beneath the saws and brushes, means raising one end of each of the trays beneath the saws so that a deeper cut will be made in the tail portions of the shrimp, and means revolving the saws and brushes.

4. A machine for treating shrimp comprising a supporting frame, a plurality of spaced circular saws mounted above the frame, a plurality of circular brushes in successive aligned arrangement with the saws, trays for supporting shrimp in alignment with the saws, means clamping the individual shrimp on the trays, means moving the trays along a path beneath the saws and brushes, means raising one end of each of the trays beneath the saws so that a deeper cut will be made in the tail portions of the shrimp, and means revolving the saws and brushes.

5. A machine for treating shrimp comprising a supporting frame, a plurality of spaced circular saws mounted above the frame, a plurality of circular brushes in successive aligned arrangement with the saws, trays for supporting shrimp in alignment with the saws, means clamping the individual shrimp on the trays, means actuating all of the clamping means simultaneously, means moving the trays along a path beneath the saws and brushes, and means raising the leading ends of the trays beneath the saws and brushes.

6. A machine for treating shrimp comprising a supporting frame, a plurality of spaced circular saws mounted above the frame, a plurality of circular brushes in successive aligned arrangement with the saws, trays for supporting shrimp in alignment with the saw, means clamping the individual shrimp on the trays, means actuating all of the clamping means simultaneously, means on the frame engageable with the clamp actuating means on each tray for releasing said actuating means after the trays have passed the brushes for moving the clamping means to an inoperative position, means projecting from the bottoms of the trays, and spaced means beneath the saws and brushes for raising the leading ends of the trays when the saws and brushes engage the shrimp on the trays.

7. A machine for treating shrimp comprising a supporting frame, a plurality of spaced circular saws mounted above the frame, a plurality of circular brushes in successive aligned arrangement with the saws, trays for supporting shrimp in alignment with the saws, a pair of movable spring clamping arms embracing each shrimp, a movable wedge alternately disposed between each pair so that when the wedges are moved the adjacently disposed arms of each pair are moved into clamping relation with a shrimp, means moving all of the wedges simultaneously, means moving the trays along a path beneath the saws, and means rotating the saws and brushes.

8. A machine for treating shrimp comprising a supporting frame, a plurality of spaced circular saws mounted above the frame, a plurality of circular brushes in successive aligned arrangement with the saws, trays for supporting shrimp in alignment with the saws, a pair of movable spring clamping arms embracing each shrimp, a movable wedge alternately disposed between each pair so that when the wedges are moved the adjacently disposed arms of each pair are moved into clamping relation with a shrimp, means moving all of the wedges simultaneously, means moving the trays along a path beneath the saws, means on the frame and engageable with the moving means for releasing the wedges and the clamping means from the spring, and means rotating the saws and brushes.

9. A machine for treating shrimp comprising a supporting frame, a plurality of spaced circular saws mounted above the frame, a plurality of circular brushes in successive aligned arrangement with the saws, trays for supporting shrimp in alignment with the saws, a pair of movable spring clamping arms embracing each shrimp, a movable wedge alternately disposed between each pair so that when the wedges are moved the adjacently disposed arms of each pair are moved into clamping relation with a shrimp, means moving all of the wedges simultaneously, means moving the trays along a path beneath the saws, means on the frame and engageable with the moving means for releasing the wedges and the clamping arms from the shrimp, means spraying water on the shrimp when said shrimp are being acted on by the saws and brushes, and means rotating the saws and brushes.

10. A machine for treating shrimp comprising a supporting frame, a plurality of spaced circular saws mounted above the frame, a plurality of circular brushes in successive aligned arrangement with the saws, trays for supporting shrimp in alignment with the saws, a pair of movable spring clamping arms embracing each shrimp, a movable wedge alternately disposed between each pair so that when the wedges are moved the adjacently disposed arms of each pair are moved into clamping relation with a shrimp, means moving all of the wedges simultaneously, means moving the trays along a path beneath the saws, means raising the trays and likewise the tail portions of the shrimp when said shrimp are being acted upon by the saws and brushes, and means rotating the saws and brushes.

RUPERT E. WEEMS.